United States Patent
Kato et al.

[11] Patent Number: 5,674,461
[45] Date of Patent: Oct. 7, 1997

[54] EXHAUST DEVICE

[75] Inventors: Hiroshi Kato; Mitsuo Kusa; Kensuke Suzuki; Takahito Sekita, all of Saitama, Japan

[73] Assignee: Honda Giken Kogyo Kabushiki Kaisha, Tokyo, Japan

[21] Appl. No.: 637,597

[22] Filed: Apr. 24, 1996

Related U.S. Application Data

[63] Continuation of Ser. No. 355,179, Dec. 8, 1994, abandoned.

[30] Foreign Application Priority Data

Dec. 9, 1993 [JP] Japan .................. 5-071545 U
Dec. 9, 1993 [JP] Japan .................. 5-340389

[51] Int. Cl.$^6$ .................. B01D 53/34; F01N 3/10
[52] U.S. Cl. .................. 422/179; 422/171; 422/177; 422/180; 422/211; 422/221; 422/222; 60/299; 60/302; 251/368; 137/625.32
[58] Field of Search .................. 422/171, 176, 422/177, 179, 180, 211, 221, 222; 60/299, 324, 286, 302; 137/625.32; 251/368

[56] References Cited

U.S. PATENT DOCUMENTS

| | | | |
|---|---|---|---|
| 3,247,666 | 4/1966 | Behrens | 60/302 |
| 3,948,611 | 4/1976 | Stawsky | 60/299 |
| 4,004,888 | 1/1977 | Musall et al. | 422/179 |
| 4,051,821 | 10/1977 | Amann | 60/324 |
| 4,081,960 | 4/1978 | Haka | 60/289 |
| 4,142,964 | 3/1979 | Rosynsky et al. | 422/179 |
| 4,335,077 | 6/1982 | Santiago et al. | 422/179 |
| 4,353,872 | 10/1982 | Midorikawa | 422/179 |
| 4,540,025 | 9/1985 | Ledeen et al. | 137/625.32 |
| 4,818,497 | 4/1989 | Andersson et al. | 422/179 |
| 4,889,163 | 12/1989 | Engelbertsson | 137/625.32 |
| 5,125,231 | 6/1992 | Patil et al. | 422/171 |
| 5,151,254 | 9/1992 | Arai et al. | 422/180 |
| 5,167,934 | 12/1992 | Wolf et al. | 422/177 |
| 5,291,913 | 3/1994 | Hill et al. | 251/368 |

FOREIGN PATENT DOCUMENTS 60-72925 5/1985 Japan.

*Primary Examiner*—Hien Tran
*Attorney, Agent, or Firm*—Sughrue, Mion, Zinn, Macpeak & Seas, PLLC

[57] ABSTRACT

An exhaust gas purifying device includes a cylindrical carrier carrying a catalyst, the carrier having a number of holes in the cylindrical wall thereof, an exhaust pipe into which the cylindrical carrier is inserted, an elastic member set radially compressed between a part of the outer cylindrical surface of at least one end portion of the carrier and a recess formed in the inner cylindrical surface of the exhaust pipe which is confronted with the part of the outer cylindrical surface, pressing pieces protruded from the outer cylindrical surface of the carrier so as to engage with the inner end face of the elastic member as viewed in the direction of axis thereof, the pressing pieces cooperating with the end of the recess to compress the elastic member axially, and a valve chamber formed in the exhaust pipe, the valve chamber having a valve body which includes a valve shaft penetrating the valve chamber in a direction of diameter, and a valve body fixedly mounted on the valve shaft.

5 Claims, 9 Drawing Sheets

EXHAUST DEVICE

This is a continuation of application Ser. No. 08/355,179 filed Dec. 8, 1994, now abandoned.

BACKGROUND OF THE INVENTION

1. Field of the Invention

This invention relates to exhaust gas purifying devices for engines, and more particularly to an exhaust gas purifying device in which a cylindrical carrier having a number of holes in its wall and carrying a catalyst is inserted into the exhaust pipe and further relates to an exhaust device in an engine which has a control valve for controlling exhaust gas.

2. Related Art

In a conventional exhaust gas purifying device of this type, the catalyst carrier is secured in the exhaust pipe as follows: As disclosed by Unexamined Japanese Patent Publication No. 85316/1991, the carrier is welded to the outer tube of the exhaust pipe; or as disclosed by Unexamined Japanese Patent Publication No. 229913/1991 a bridge member made of a thin plate is provided on the outer surface of the carrier, and the carrier is inserted into the outer tube with the aid of the bridge member.

The carrier, being heated by the catalytic action of the catalyst, is expanded. Hence, in an exhaust gas purifying device in which its catalyst carrier is fixed to the outer tube of an exhaust pipe by welding, a great thermal stress is set up in the welded part, thus deforming or damaging the carrier and the outer tube. If a welding part of the carrier is contaminated with the catalyst, then it is difficult to sufficiently weld it to the outer tube. Hence, in applying the catalyst to the carrier, it is necessary to mask the part to be welded. This is rather troublesome.

As was described above, in the exhaust gas purifying device of the type that the catalyst carrier is fitted in the exhaust pipe's outer tube by using the bridge member, the latter is made of a thin plate material. Hence, it is difficult to set the carrier in the outer tube with high accuracy, and it is also difficult to provide a tightening margin for the carrier which is large enough for the carrier to thermally expand and to position in place. In addition, as the carrier is heated repeatedly, the tightening margin may be loosened. Furthermore, in the device, the catalyst is applied not only to the carrier but also to the bridge member. This is not economical.

On the other hand, an engine is known in the art in which a control valve is provided in the exhaust system to change the output characteristic or exhaust gas characteristic of the engine. In this connection, an engine output adjusting device has been disclosed, for instance, by Unexamined Japanese Utility Patent Publication No. 72925/1985 which is designed as follows: A chamber is provided in a part of the exhaust pipe connected to the engine exhaust port, and a butterfly valve is rotatably mounted in the chamber with a clearance between the valve and the chamber. The valve is operated (opened and closed) in association with the throttle valve.

The above-described control valve provided in the exhaust valve suffers from the following difficulties: Carbon particles contained in the exhaust gas are liable to stick onto the control valve. At worst, the carbon particles thus stuck obstruct the operation of the control valve, and changes the clearance between the valve body and the exhaust pipe to adversely affect the function of the control valve.

SUMMARY OF THE INVENTION

An object of the present invention is to provide an engine exhaust system prevented from being adversely affected in operation or function by carbon particles deposited on the control valve.

Another object of the present invention is to provide an engine exhaust system for absorbing a thermal expansion and vibration of a carrier.

An aspect of the present invention is to provide an exhaust gas purifying device in which a cylindrical carrier having a number of holes in the cylindrical wall and carrying a catalyst is inserted into an exhaust pipe; in which a heat-resisting elastic member is set between a part of the outer cylindrical surface of at least one end portion of the carrier and a recess formed in the inner cylindrical surface of an exhaust pipe's outer tube which is confronted therewith in such a manner that the elastic member is radially compressed therein, and the elastic member thus set is axially compressed by being pressed against the end of the recess by pressing pieces which are protruded from the outer cylindrical surface of the carrier so as to engage with the inner end face of the elastic member as viewed in the direction of axis thereof.

Furthermore, another aspect of the invention is to provide an exhaust device in an engine which comprises a control valve which is provided in an exhaust gas passageway communicated with the exhaust port of the engine, to vary the open area of the exhaust gas passageway; in which at least a part of the valve body of the control valve carries rare metal catalyst.

In the exhaust gas purifying device of the present invention, the carrier is slidably held through the elastic member by the outer tube of the exhaust pipe. Hence, the carrier can freely expand with respect to the outer tube when heated, and therefore no thermal stress is set up between the carrier and the outer tube. The vibration of the carrier, which may be caused by the flow of exhaust gas, is effectively absorbed by the elastic member.

The carrier is positioned in place, both in a radial direction and in an axial direction, in the outer tube by the elastic force of the elastic member; that is, it scarcely rocks in the outer tube.

Furthermore, the carrier is not welded to the outer tube. This eliminates the troublesome work of masking the welding parts before application of the catalyst to the carrier, and the difficulty that the catalyst is adversely affected by the welding heat.

According to the present invention, a peripheral portion of the valve body increases in temperature by a catalytic action of a noble metal catalyst to prevent the sticking of carbon particles to the valve body. As a result, the engine is prevented from being adversely affected in operation or function by carbon particles. Therefore, when the exhaust gas passes through the valve body, the combustion of its part which has not been burned yet is accelerated by the catalytic action of the noble metal catalyst.

DETAILED DESCRIPTION OF THE PREFERRED EMBODIMENTS

Figure 1:
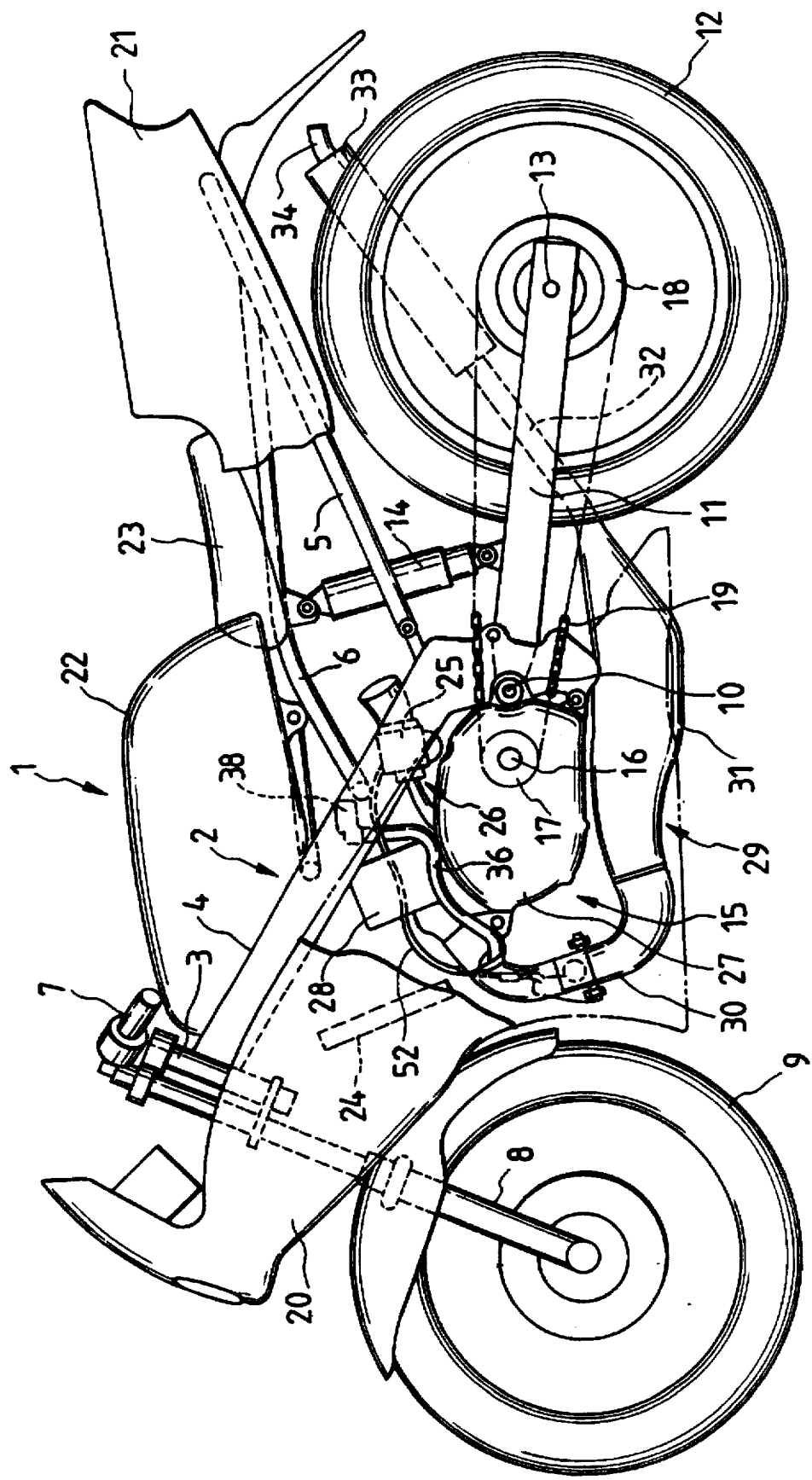
FIG. 1 is a side view showing a motor bicycle with an example of an exhaust gas purifying device, which constitutes one embodiment of the invention.

FIG. 1 is a side view showing a motor-bicycle with an exhaust gas purifying device according the invention. In FIG. 1, reference numeral 1 designates a bicycle body frame which comprises: a main frame 4 which is extended obliquely downwardly from a head pipe 3; a rear frame 5 which is extended obliquely upwardly from the rear end of the main frame 4; and a seat rail 6 which is extended backwardly from the middle of the main frame 4 and connected to the rear end of the rear frame 5.

In the front of the motor-bicycle body, a front fork 8 is extended vertically which is pivotally coupled to the head pipe 3. The front fork 8 can be turned with a handle 7. A front wheel 9 is rotatably mounted on the lower end portion of the front fork 8. A rear fork 11 is mounted on the rear (lower) end portion of the main frame 4 through a pivot shaft 10 in such a manner that it is vertically rockable. A rear wheel 12 is rotatably mounted on the rear end portion of the rear fork 11 through a rear axle 13. A rear shock absorber 14 is connected between the rear fork 11 and the seat rail 6. An engine 15 is set between the front wheel 9 and the rear wheel 12; more specifically, it is mounted on the main frame 4. An endless drive chain 19 is laid over a driving sprocket 17 mounted on the output shaft 16 of the engine 15 and a driven sprocket 18 mounted on the rear axle 13 so that the rear wheel 12 is driven through the drive chain 19 by the engine 15.

The motor-bicycle body is covered with a cowling 20 and a rear motor-bicycle body cover 21. More specifically, the front and both sides of the motor-bicycle body are covered with the cowling 20, and the rear of the motor-bicycle body is covered with the rear motor-bicycle body cover 21. In FIG. 1, reference numeral 22 designates a fuel tank; 23, a seat; and 24, a radiator set in front of the engine 15.

The engine is a two-cycle engine, and its suction system having a carburetor 25 is communicated with a crank chamber formed in a crank case 27. On the other hand, its exhaust system 29 is connected to the exhaust port of the cylinder 28. The exhaust system 29 is extended down the front of the engine 15, and bent backwardly, and is further extended below the engine 15 and then obliquely upwardly beside the rear wheel 12. The exhaust system 29 has an outlet at the rear end of the motor-bicycle body. The exhaust system 29 is made up of an exhaust pipe 30, an expansion pipe 31, a connecting pipe 32, a silencer 33, and a discharge pipe 34 which are connected to the cylinder 28 in the stated order.

Figure 2:
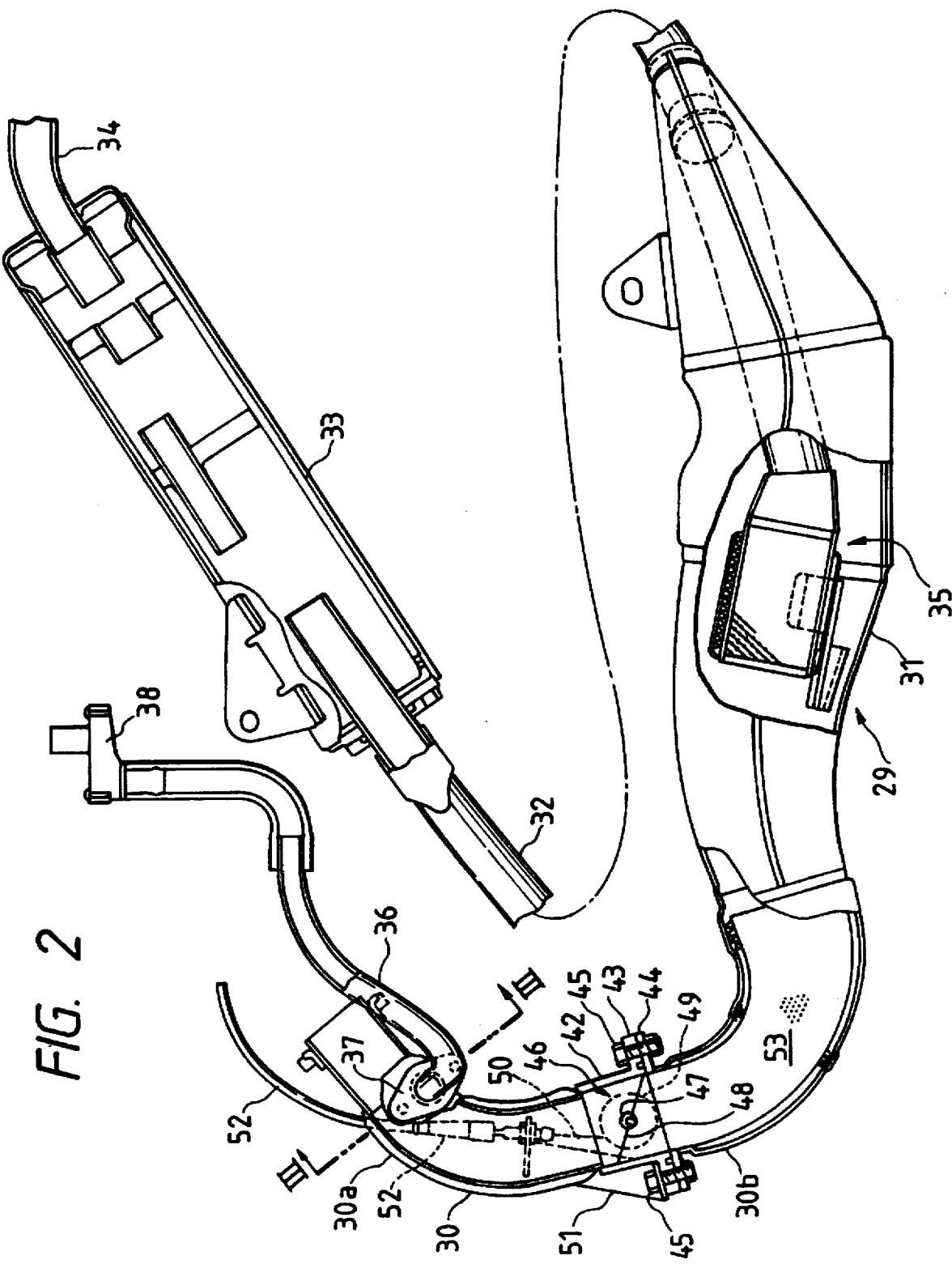
FIG. 2 is an enlarged diagram showing only the exhaust system of the motor bicycle.

FIG. 2 is an enlarged diagram showing the exhaust system 29. As shown in FIG. 2, a catalytic converter 35 for purifying exhaust gas is provided inside the expansion pipe 31. Secondary air for accelerating the catalytic action of the catalytic converter 35 is supplied from a secondary air supply pipe 36 to the exhaust gas in the upstream part of the exhaust pipe 30 near the cylinder exhaust port. The secondary air supply pipe 36 is connected through a flange 37 to the exhaust pipe 30 (cf. FIG. 3). The secondary air supply pipe 36 has an air inlet at its upstream-side end which is provided with a reed valve 38. When the pressure in the exhaust pipe 30 becomes negative, the reed valve 38 is opened, so that the external air is introduced, as secondary air, through the secondary air supply pipe 36 into the exhaust pipe 30.

Figure 3:
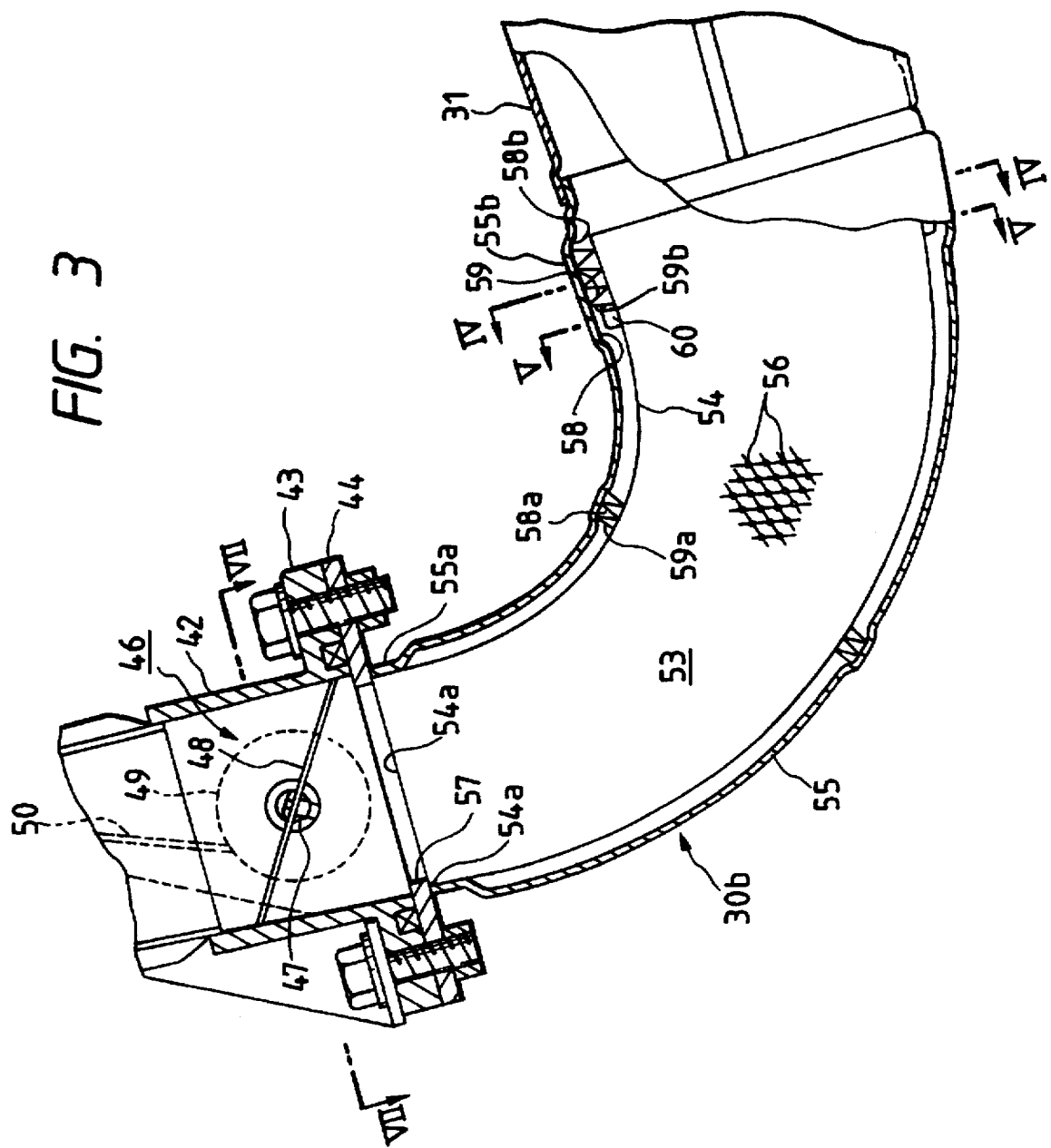
FIG. 3 is an enlarged sectional view of the exhaust gas purifying device shown in FIG. 2.

The exhaust pipe 30 is divided into two parts; namely, an upstream-side part 30a and a downstream-side part 30b. A valve chamber 42 is formed at the junction of those two parts 30a and 30b. FIG. 3 is an enlarged diagram showing the valve chamber 42 in detail. The valve chamber 42 is fixedly secured at the one to the end of the upstream-side part 30a of the exhaust pipe 30. The valve chamber 42 has a flange 43 at the other end which is opposite to the end connected to the upstream-side part 30a. The flange 43 is secured to a flange 44 with bolts 45 which is secured to the downstream-side part 30b of the exhaust pipe 30. Thus, the upstream-side part 30a and the downstream-side part 30b of the exhaust pipe 30 are joined together.

A control (opening and closing) valve 46 is provided inside the valve chamber 42, to vary the aperture area of the exhaust gas passageway. The control valve 46 comprises a rotary valve shaft 47 which penetrates the valve chamber 42 in the direction of diameter; and a disk-shaped valve body 48 fixedly mounted on the valve shaft 47. That is, the control valve 46 is a butterfly type valve, and it is urged to fully close the exhaust gas passageway.

Figures 9, 10:
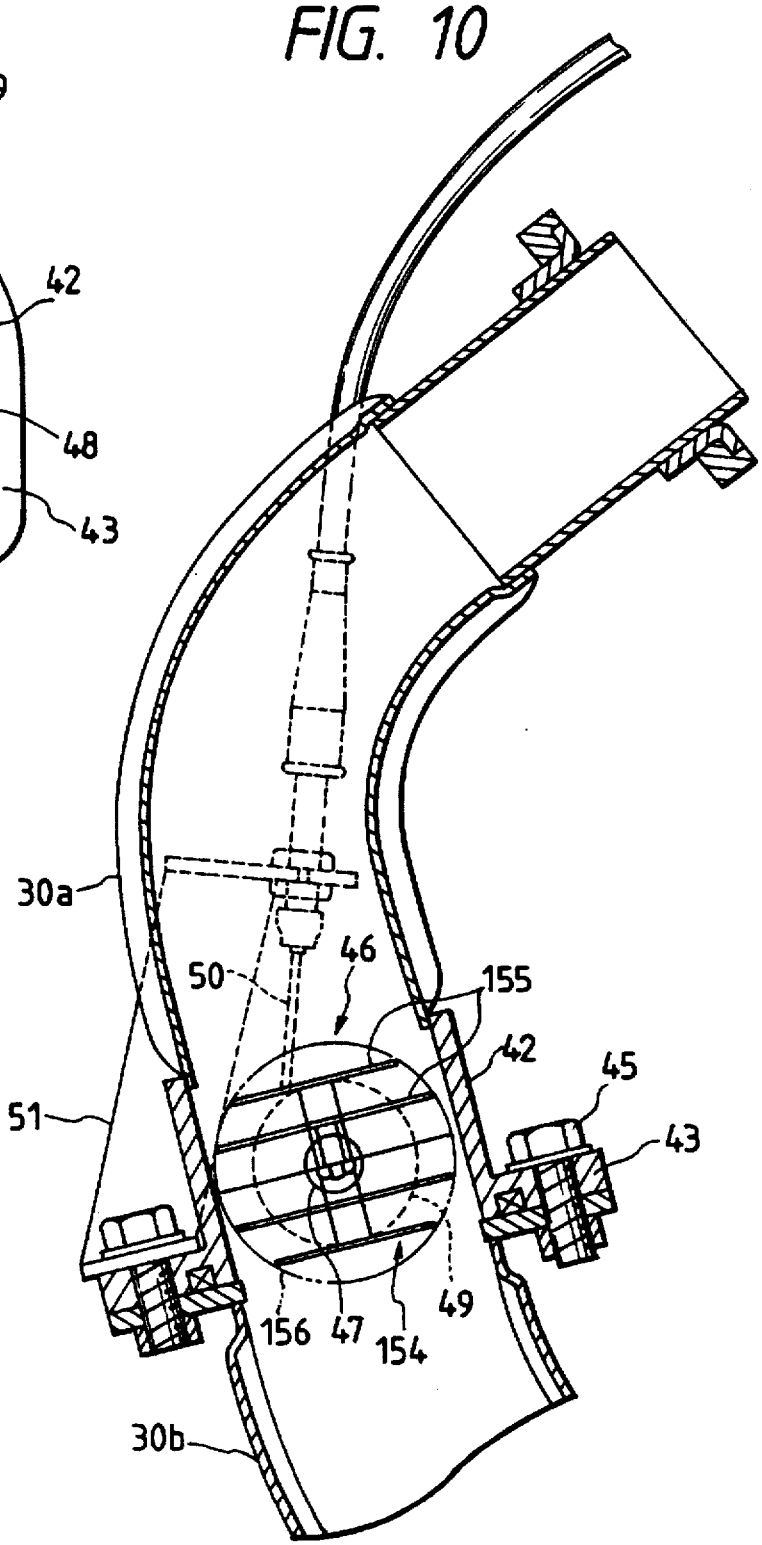
FIG. 9 is a sectional view taken along line VII—VII in FIG. 3.
FIG. 10 is an enlarged sectional view of another embodiment of the invention, corresponding to FIG. 3.

A pulley 49 is fixedly mounted on one end portion of the valve shaft 47 which is extended through the valve chamber 42 (cf. FIG. 9). A wire 50 is wound on the pulley 49 with its one end connected to the latter, and then inserted into a sheath pipe 52 whose one end is fastened to a bracket 51 which has been secured to the flange 43 with the aforementioned bolts 45. The sheath pipe 52, as shown in FIG. 1, is extended to the carburetor 25, and its other end is fixed near the carburetor 25. The other end of the wire 50 is connected to a throttle valve (not shown) in the carburetor 25. As is apparent from the above description, the control valve 46 is adapted to vary the aperture area of the exhaust gas passageway in association with the operation of the throttle valve; that is, the control valve 46 operates to change the output characteristic and the exhaust characteristic of the engine according to the degree of opening of the throttle valve.

Since the valve body 48 is held in exhaust gas, carbon particles are liable to stick onto it. If carbon particles stick onto the outer periphery of the valve body 48, then they may interfere with the inner surface of the valve chamber 42 to obstruct the operation of the valve body 48 or they change the clearance between the periphery of the valve body and the inner surface of the valve chamber 42, thus adversely affecting the operation of the control valve.

In order to eliminate the above-described difficulty, the peripheral portion of the valve body 48 is coated with noble metal catalyst as indicated at 153. Therefore, when the exhaust gas passes through the valve body 48, the combustion of its part which has not been burned yet is accelerated by the catalytic action of the noble metal catalyst 153 on the peripheral portion of the valve body 48, so that the peripheral portion of the valve body 48 is increased in temperature, which prevents the sticking of carbon particles thereto.

At the same time, the exhaust gas is purified. That is, the noble metal catalyst 153 serves not only to prevent the function of the control valve 46 from being lowered, but also to purify the exhaust gas.

In the above-described embodiment, only the peripheral portion of the valve body carries the noble metal catalyst 153; however, the invention is not limited thereto or thereby. That is, the whole of the valve body may be coated with the noble metal catalyst 153.

Figure 11:
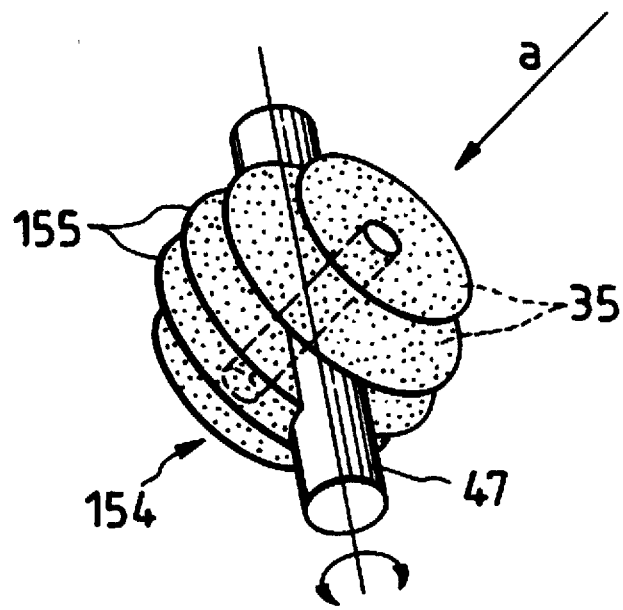
FIG. 11 is a perspective view of a control valve shown in FIG. 10 which is fully closed.
Figure 12:
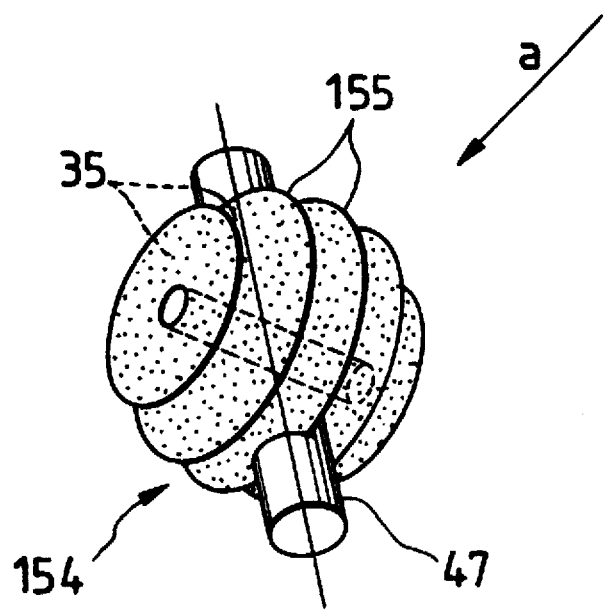
FIG. 12 is a perspective view of the control valve which is fully opened.

FIGS. 10 through 12 show another embodiment of the invention. In FIGS. 10 through 12, parts corresponding functionally to those in the above-described embodiment are therefore designated by the same reference numerals or characters.

In the embodiment, the control valve 46 has a valve body 154 made up of a plurality of disks 155 which are arranged at predetermined intervals. It should be noted that the peripheries of those disks 155 thus arranged define a spherical surface as indicated at 156. The valve body 154 operates as follows: When the valve body 154 is turned until the disks 155 are perpendicular to the axial line of the exhaust gas 30; i.e., to the direction of the flow of exhaust gas, the valve body 154 fully closes the exhaust pipe 30; and when it is turned until the disks 155 are in parallel with the direction of the flow of exhaust gas as shown in FIG. 12, the valve body fully opens the exhaust pipe 30. In the latter case, the exhaust gas is allowed to flow along the disks 155.

In the valve body 154, both sides of each of the disks 155 are coated with noble metal catalyst as indicated at 153. As was described above, the exhaust gas flows along the disks 155. Hence, the exhaust gas is sufficiently brought into contact with the noble metal catalyst 153, which further enhances the purification of exhaust gas by the catalytic action of noble metal catalyst.

The downstream-side part 30b of the exhaust pipe corresponds to the exhaust gas purifying device 53 according to the invention. The exhaust gas purifying device 53 is to supplement the exhaust gas purifying action of the above-described catalytic converter 35. The device 53 is simple in structure. The exhaust gas is sufficiently purified by the exhaust gas purifying device 53 and the catalytic converter 35. The provision of the exhaust gas purifying device 53 increases the durability of the catalytic converter 35.

FIG. 3 is an enlarged sectional view showing the exhaust pipe downstream-side part 30b; i.e., the exhaust gas purifying device. The exhaust gas purifying device 53 comprises: an exhaust pipe's outer tube 55; and a catalyst carrier 54 carrying catalyst which is inserted coaxially into the outer tube 55. The embodiment is not limited to this arrangement. It is applicable to eccentrically position the catalyst carrier 54 into the outer tube 55.

Figure 4:
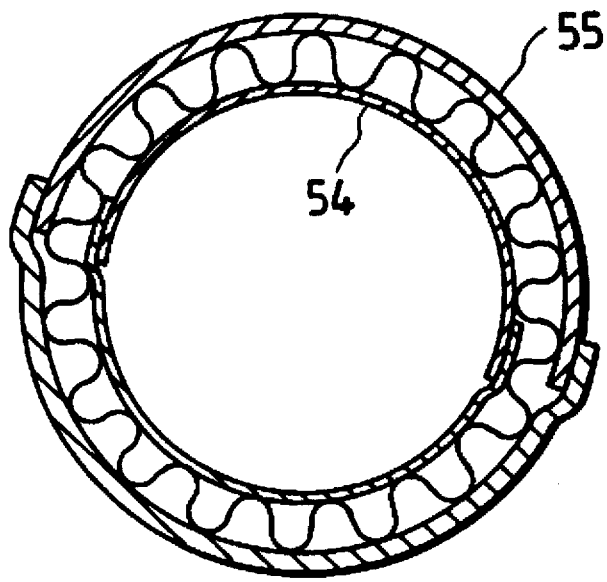
FIG. 4 is a sectional view taken along line IV—IV in FIG. 3.
Figure 5:
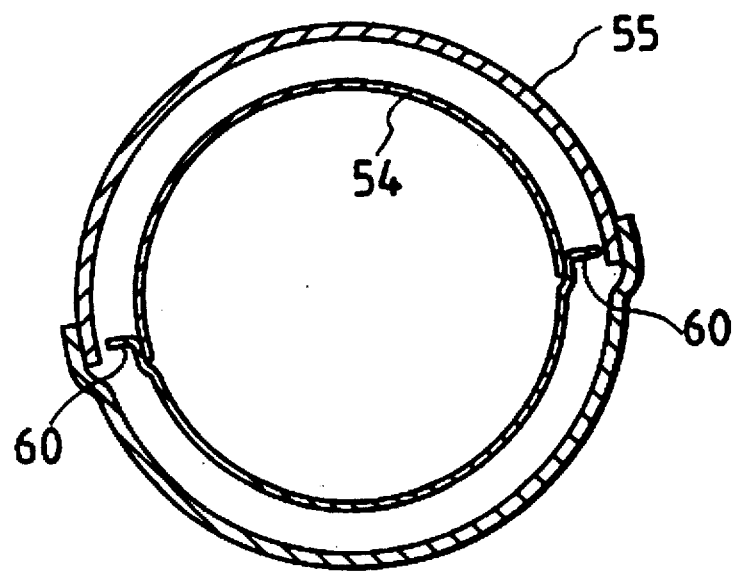
FIG. 5 is a sectional view taken along line V—V in FIG. 3.

The catalyst carrier 54 is formed as follows: First, two halves of the carrier 54 are formed by bending a plate material of stainless steel having a number of holes 56 (such as a punching plate), and are then joined together, for instance, by spot-welding (cf. FIGS. 4 and 5). The catalyst carrier 54 thus formed is substantially cylindrical. The catalyst carrier 54 is coated with noble metal catalyst. The outer tube 55 is formed in the same manner as the catalyst carrier 54. That is, two halves of the outer tube 55 are formed, and then joined together. The catalyst carrier 54 and the outer tube 55 are similar in configuration to each other, so that when the former 54 is inserted into the latter, there is provided a uniform space (gap) between them all through the length.

The upstream-side end portion 55a of the outer tube 55 is decreased in diameter so that it is fitted on the upstream-side end portion of the catalyst carrier 54. The upstream-side end portion 55a of the outer tube 55 is welded to the above-described flange 44. The inner periphery of the flange 44 is radially inwardly extended over the inner periphery of the upstream-side end portion 55a of the outer tube 55, thus providing an abutting portion 57 against which the end face 54a of the upstream-side end portion of the catalyst carrier 54 is abutted. The end face 54a is not welded to the abutting portion 57 of the flange.

The downstream-side end portion of the outer tube 55 is connected to the expansion pipe 31. The downstream-side end portion of the outer tube 55 is increased in diameter as indicated at 55b, thus forming an annular recess 58 in its inner surface near the junction. The annular recess 58 accommodates an annular elastic member 59 which is a net formed cylindrical with a stainless steel wire about 0.2 mm in diameter. The annular elastic member 59 thus formed is high in heat resistance and in elasticity. The inner periphery of the annular elastic member 59 set in the annular recess 58 is in contact with the outer cylindrical surface of the downstream-side end portion of the catalyst carrier 54. More specifically, the annular elastic member 59 is set between the inner cylindrical surface of the recess 58 and the outer cylindrical surface of the catalyst carrier 54 in such a manner that it is radially compressed therein.

The outer tube 55 has an annular recess 58a at the middle which is similar the above-described annular recess 58, and an annular elastic member 59a similar to the above-described annular elastic member 59 is set radially compressed between the inner cylindrical surface of the recess 58a and the outer cylindrical surface of the catalyst carrier 54. Thus, the catalyst carrier 54 is elastically supported through the annular elastic members 59 and 59a by the outer tube 55 with a uniform space between the catalyst carrier 54 and the outer tube 55.

The catalyst carrier 54 has pressing pieces 60 on its outer cylindrical surface which are brought into contact with the elastic member 59. The pressing pieces 60 are formed by bending a pair of tongue pieces which are extended radially outwardly from both edges of one of the two halves of the catalyst carrier 54 (cf. FIG. 5). The pressing pieces 60 are engaged with the upstream-side end face 59b of the elastic member 59. More specifically, the pressing pieces 60 are so positioned that when engaged with the upstream-side end face 59b, the pressing pieces 60 push the elastic member 59 against the downstream-side wall 58b of the annular recess 58. Hence, the catalyst carrier 54 is pushed axially by the reaction force of the elastic member 59, so that the upstream-side end face 54a of the catalyst carrier is held engaged with the abutting portion 57 of the flange 44 at all times; that is, the catalyst carrier 54 is held positioned in place in the outer tube 55 in the axial direction.

As is apparent from the above description, the catalyst carrier 54 is positioned in place in the radial direction by the radial elastic forces of the elastic members 59 and 59a, and positioned in place in the axial direction by the axial elastic forces of the same; but it is not fixed to the outer tube 55. Hence, when heated, the catalyst carrier 54 can expand freely against the elastic forces of the elastic members. Accordingly, no great thermal stress is set up between the catalyst carrier 54 and the outer tube 55. On the other hand, the elastic members 59 and 59a absorb the vibration of the catalyst carrier 54 which may be caused by the flow of exhaust gas; that is, they prevent the transmission of the vibration to the outer tube 55. Furthermore, the catalyst carrier 54 is not welded to the outer tube. This eliminates the troublesome work of masking the welding parts before application of the catalyst to the carrier, and the difficulty that the catalyst is adversely affected by the welding heat.

In the above-described embodiment, the downstream-side end portion of the catalyst carrier 54 is held through the elastic member 59, and the upstream-side end portion is abutted against the abutting portion 57. The embodiment of the present invention may be so modified that the downstream-side end portion is held by the abutting portion (57) while the upstream-side end portion is held by the elastic member (59), or both end portions are held through the elastic members (59). In the latter case, the forces of reaction of the elastic members at both ends, being effected in the opposite directions, position the catalyst carrier 54 in place in the axial direction.

In an exhaust gas purifying device in which, like the above-described device, a cylindrical catalyst carrier carries a noble metal catalyst, the latter scarcely acts on the central part of the stream of exhaust gas flowing in the catalyst carrier. That is, the device is accordingly low in gas purification efficiency. However, in the above-described embodiment, the gas purification efficiency is maintained high by the control valve 46 which is located immediately before the exhaust gas purifying device 53 as viewed in the direction of the flow of exhaust gas. That is, since the exhaust gas is caused to flow around the valve body 48 when passing through the control valve 46, the resultant exhaust gas stream passed through the control valve 46 is deflected towards the cylindrical wall of the catalyst carrier 54, thus being more positively subjected to catalytic action.

Figure 6:
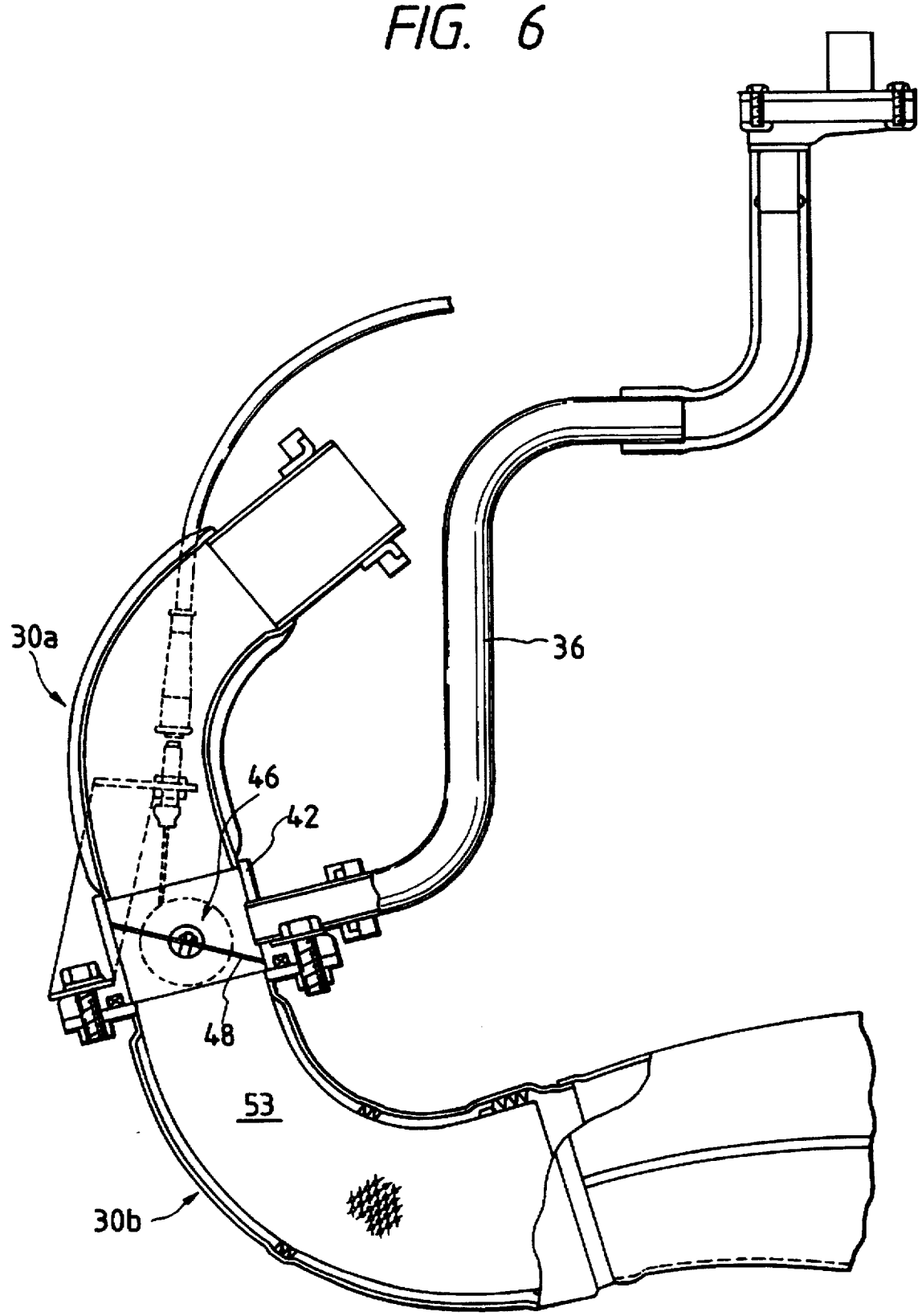
FIG. 6 is a longitudinal sectional view of an exhaust pipe, showing another embodiment of the invention.

In the above-described embodiment, the secondary air supply pipe 36 is connected to the upstream-side part of the exhaust pipe 30 near the cylinder exhaust port. However, the secondary air supply pipe 36 may be connected to the valve chamber 42 as shown in FIG. 6. In this case, the negative pressure which is formed around the valve body 48 in the valve chamber 42 can be utilized to supply the secondary air with high efficiency, and to sufficiently mix the secondary air with the exhaust gas.

Figure 7:
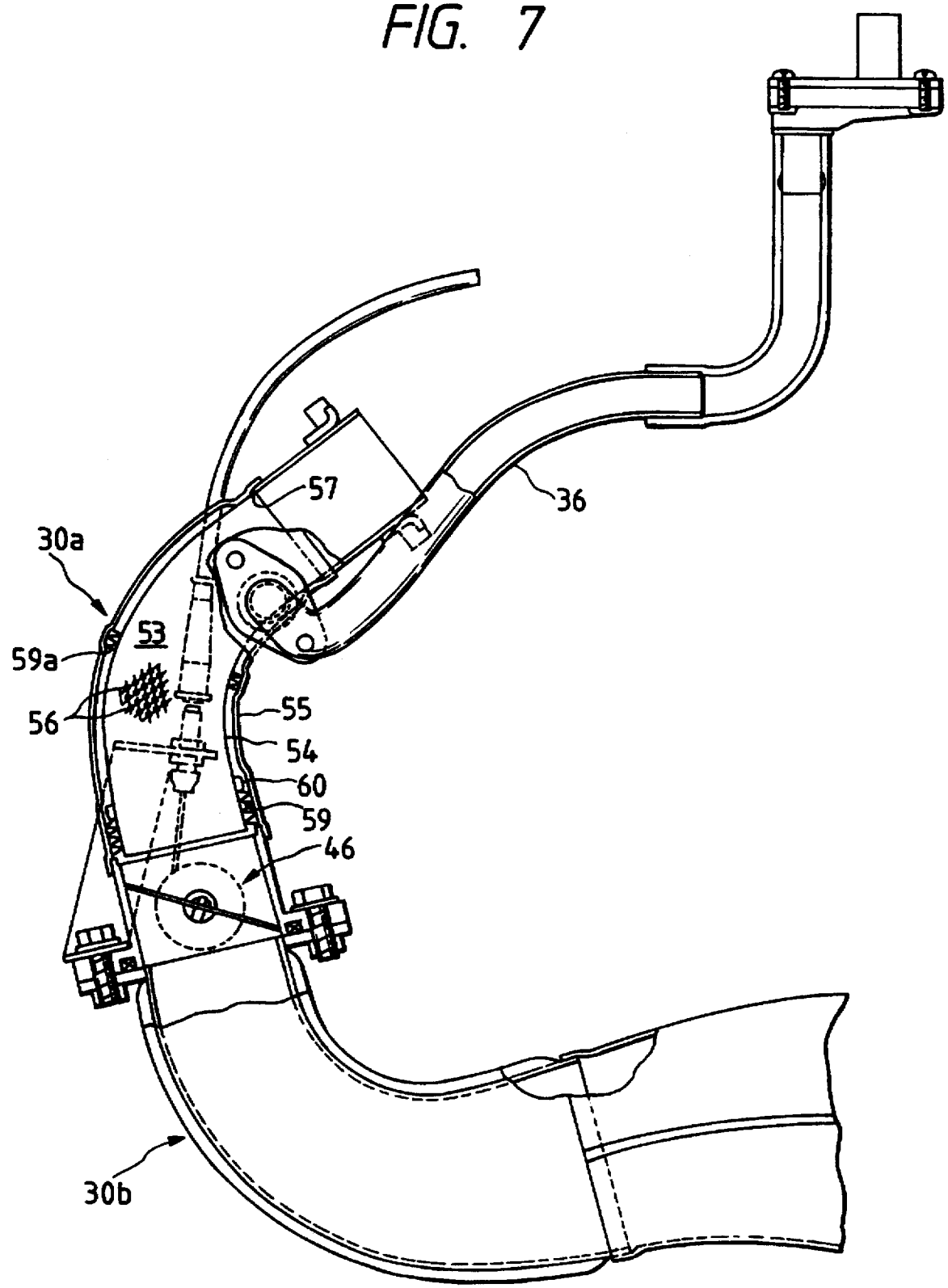
FIG. 7 is also a longitudinal sectional view of an exhaust pipe, corresponding to FIG. 6, showing another embodiment of the invention.

FIG. 7 shows another embodiment of the invention in which the upstream-side part 30a of the exhaust pipe 30 has an exhaust gas purifying device 53. The device 53 is equivalent in construction to the above-described one. Hence, in FIG. 7, parts corresponding functionally to those in the above-described embodiment are therefore designated by the same reference numerals or characters. In the embodiment, as shown in FIG. 7, the control valve 46 is provided downstream of the exhaust gas purifying device 53. Hence, by controlling the operation of the control valve 46 suitably according to the operating condition of the engine, the pressure in the exhaust pipe can be made substantially positive and maintained substantially unchanged; that is, the exhaust gas purifying device is increased in exhaust gas retention time and according in exhaust gas purifying efficiency as much.

Figure 8:
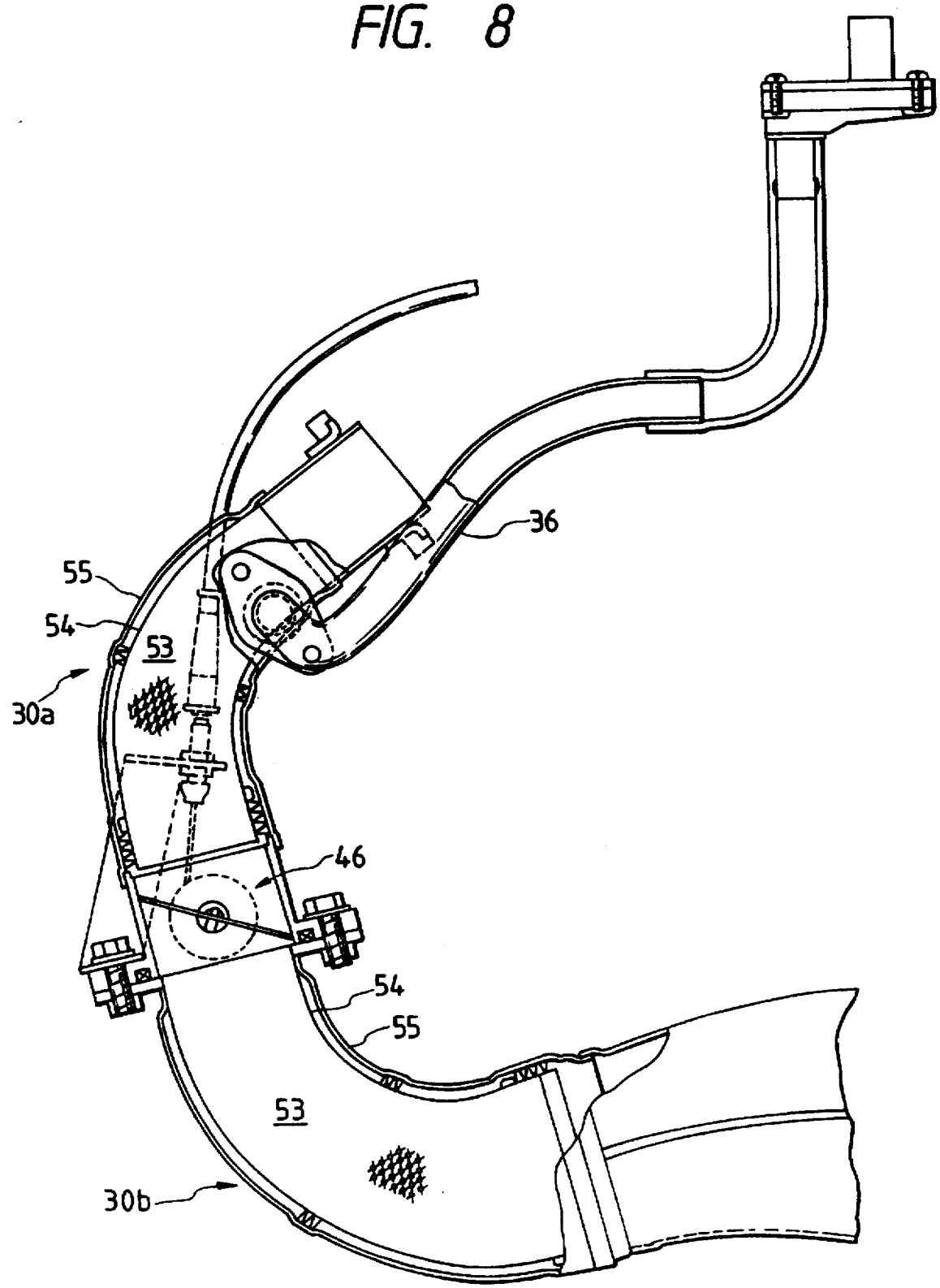
FIG. 8 is also a longitudinal sectional view of an exhaust pipe, corresponding to FIG. 6, showing another embodiment of the invention.

FIG. 8 shows another embodiment of the invention in which the upstream-side part 30a and the downstream-side part 30b of the exhaust pipe have exhaust gas purifying devices 53 and 53, respectively, which are similar in construction to the above-described one.

As was described above, with the exhaust gas purifying device comprising the cylindrical catalyst carrier which has a number of holes in the cylindrical wall and carries the noble metal catalyst, and which is inserted into the exhaust pipe; according to the invention, the catalyst carrier is positively positioned inside the exhaust pipe's outer tube, and yet it is allowed to freely expand with respect to the outer tube when heated. In addition, with the purifying device, it is unnecessary to mask the welded parts in applying the catalyst to the carrier.

Furthermore, the invention has the following effects or merits: The engine is prevented from being adversely affected in operation or function by carbon particles deposited on the control valve provided in the engine exhaust system, and is improved in exhaust gas purification.

What is claimed is:

1. An exhaust gas purifying device for a motor cycle including a two-cycle engine, comprising:

(a) a cylindrical carrier including a cylindrical wall defining an outer cylindrical surface and having a number of holes in the cylindrical wall thereof, said cylindrical wall carrying a catalyst;

(b) an exhaust pipe (30), communicated with a two-cycle engine, including an upstream portion (30a) having a substantially constant diameter and which is catalyst free, and a downstream portion (30b) formed by an outer tube (55) which gradually expands in diameter and which defines an inner cylindrical surface into which said cylindrical carrier is inserted;

(c) a first annular elastic member (59) which is in direct contact with a part of the outer cylindrical surface of a downstream end portion of said cylindrical carrier, and a second annular elastic member (59a) which is in direct contact with a middle portion of the outer cylindrical surface of said cylindrical carrier, wherein said first and second annular elastic members are radially compressed with respect to said exhaust pipe so as to hold said cylindrical carrier;

(d) a pressing piece (60) and engaging means (58) for suppressing movement of at least said first annular elastic member in an axial direction, said pressing piece provided on the outer cylindrical surface of the cylindrical carrier at a location which is spaced apart from the downstream end portion of the cylindrical carrier to which said first annular elastic member is in direct contact, said engaging means being formed at an expanded wall portion of the outer tube (55); and (e) a valve chamber formed in the exhaust pipe, the valve chamber having a valve body which includes a valve shaft penetrating the valve chamber and rotatably mounted in the valve chamber, said valve body being fixedly mounted on the valve shaft, wherein at least a part of the valve body carries a noble metal catalyst.

2. An exhaust gas purifying device as claimed in claim 1, wherein the cylindrical carrier is provided downstream of the valve chamber with respect to the two-cycle engine.

3. An exhaust gas purifying device as claimed in claim 1, wherein the valve body comprises at least one disk.

4. An exhaust gas purifying device as claimed in claim 1, wherein the valve body includes a plurality of disks which are arranged at predetermined intervals in such a manner that the disks are in parallel with one another.

5. An exhaust gas purifying device as claimed in claim 1, further comprising:

a secondary air supply pipe connected to the valve chamber.

* * * * *